US012287226B2

United States Patent
Okawa et al.

(10) Patent No.: US 12,287,226 B2
(45) Date of Patent: Apr. 29, 2025

(54) ROTATION DETECTION DEVICE, MEDIUM TRANSPORT DEVICE, AND RECORDING DEVICE

(71) Applicant: SEIKO EPSON CORPORATION, Tokyo (JP)

(72) Inventors: Soshi Okawa, Shiojiri (JP); Yuki Komatsu, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 200 days.

(21) Appl. No.: 18/169,254

(22) Filed: Feb. 15, 2023

(65) Prior Publication Data

US 2023/0258480 A1 Aug. 17, 2023

(30) Foreign Application Priority Data

Feb. 16, 2022 (JP) ................................. 2022-021891

(51) Int. Cl.
*G01D 11/02* (2006.01)
*G01D 11/30* (2006.01)

(52) U.S. Cl.
CPC .............. *G01D 11/02* (2013.01); *G01D 11/30* (2013.01); *G01D 2205/26* (2021.05); *G01D 2205/70* (2021.05); *G01D 2213/10* (2021.05)

(58) Field of Classification Search
CPC ................................ G01D 11/02; G01D 11/30
See application file for complete search history.

(56) References Cited

U.S. PATENT DOCUMENTS

2006/0250292 A1* 11/2006 Yamagata .......... G01D 5/34738
341/192
2009/0256309 A1* 10/2009 Hasegawa ............ G01D 5/3473
29/894

FOREIGN PATENT DOCUMENTS

JP        2006300871 A        11/2006
JP        2009250921 A   *   10/2009   ......... G01D 5/34707

* cited by examiner

*Primary Examiner* — Jamel E Williams
(74) *Attorney, Agent, or Firm* — CHIP LAW GROUP

(57) ABSTRACT

A pulley serving as a rotary body and a scale configured to rotate integrally with the pulley are attached to an end portion of the pulley serving as the rotary body in a thrust direction, a detection unit is configured to detect rotation of the pulley serving as the rotary body by reading a reading region of the scale. An absorber capable of absorbing liquid is attached to a surface of the scale on which a reading region is present, and when liquid adheres to the scale, the absorber absorbs the liquid.

16 Claims, 13 Drawing Sheets

ROTATION DETECTION DEVICE, MEDIUM TRANSPORT DEVICE, AND RECORDING DEVICE

The present application is based on, and claims priority from JP Application Serial Number 2022-021891, filed Feb. 16, 2022, the disclosure of which is hereby incorporated by reference herein in its entirety.

BACKGROUND

1. Technical Field

The present disclosure relates to a rotation detection device, a medium transport device, and a recording device.

2. Related Art

In order to detect a rotation position of a rotary part or a displacement position of a movable member, a rotation detection device that detects a rotation position of a rotary drive shaft has been utilized. As such a type of rotation detection device, there has been known a rotation detection device disclosed in JP 2009-250921 A.

A disk-shaped cord wheel 50 is adhered to one end surface of a support plate 71 via a double-sided adhesive tape 72. On an outer peripheral portion of a main surface of the cord wheel 50, regions (slit) that transmit light and pulse cords 50a that are regions not transmitting transmit light are arranged in an annularly alternating manner thus forming a code portion.

By detecting the pulse cords 50a on the cord wheel 50 by a photo sensor 51, the change in rotation speed and the change in rotation angle of the support plate 71 and a driven roller 47 are recognized through the cord wheel 50.

In many cases, the code wheel 50 is directly or indirectly coupled to a rotary drive mechanism such as a gear or a pulley, and the rotary drive mechanism is coated with grease to reduce friction. Here, a member on which the code portion is formed, such as the cord wheel, is also referred to as a scale.

When a code wheel or a scale is used to recognize the rotation of a rotating body, in many cases, the rotation drive mechanism that rotates the rotating body is disposed in the vicinity of the code wheel or the scale and grease is used and hence, there is a case where the grease adheres to the code wheel and the scale. In a mechanism that is configured to detect the rotation of the rotating body using the photo sensor by rotating the code wheel or the scale, when the grease adheres to the code wheel or the scale, various problems are liable to occur.

The present disclosure is made to suppress the occurrence of various problems caused by adhesion of liquid such as grease.

SUMMARY

According to the present disclosure, there is provided a configuration including: a rotating body that rotates in a circumferential direction, a scale that is attached to an end portion of the rotating body in a thrust direction and rotates integrally with the rotating body, a detection unit that is configured to detect the rotation of the rotating body by reading a read area of the scale, and an absorber that is attached to the scale and is capable of absorbing liquid.

In the configuration described above, the scale that rotates integrally with the rotating body is attached to the end portion of the rotating body in the thrust direction, and the detection unit is configured to detect the rotation of the rotating body by reading the reading area of the scale. The absorber capable of absorbing liquid is attached to the scale, when liquid adheres to the scale, the absorber adsorbs the liquid.

DESCRIPTION OF EXEMPLARY EMBODIMENTS

Hereinafter, exemplary embodiments of the present disclosure will be described with reference to drawings.

Figure 1:
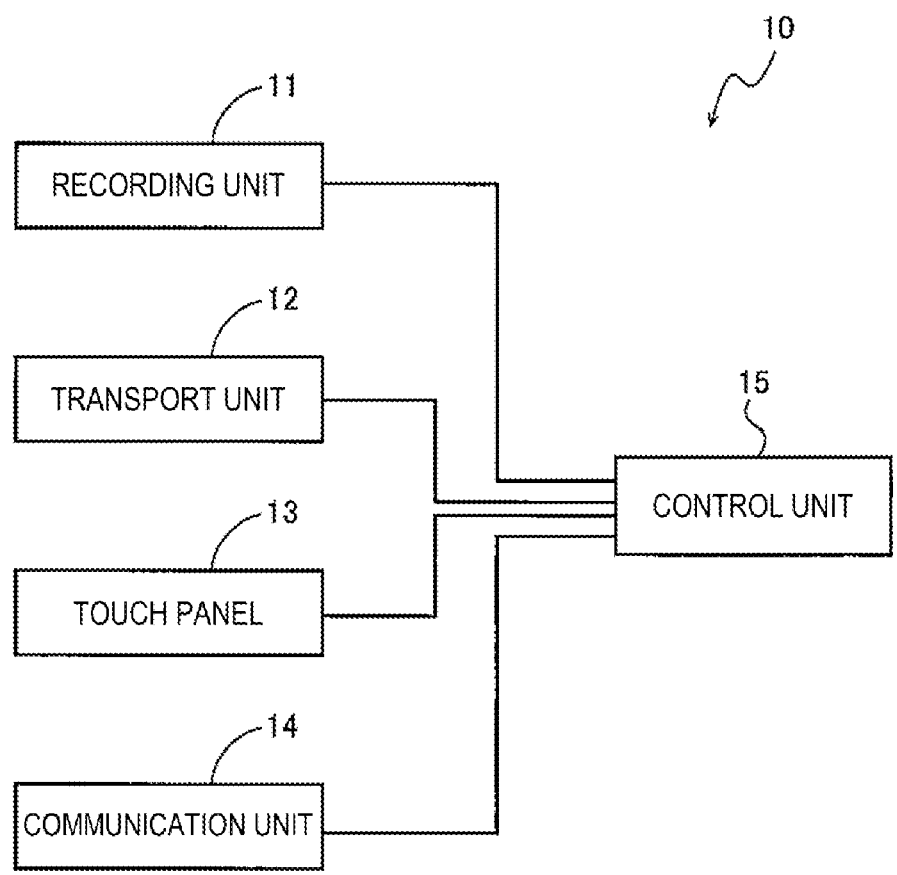
FIG. 1 is a schematic block diagram of a recording device to which a rotation detection device of the present disclosure is applied.

FIG. 1 is a schematic block diagram of a recording device to which a rotation detection device of the present disclosure is applied.

In the same drawing, a recording device 10 is an ink jet printer. A recording unit 11 is configured to move a print head not illustrated in the drawing in two-dimensional directions relative to a recording paper so as to make liquid droplets of colored ink ejected from the print head adhere to a predetermined position on the surface of the recording paper, thus forming a desired characters, symbols, patterns, and the like. The print head is configured to reciprocate in a direction substantially orthogonal to a transport direction of the recording paper, and the recording paper moves a transport unit 12 along a predetermined transport path. A reciprocation direction of the print head is referred to as a main scanning direction, and a transport direction of the recording paper is referred to as a sub scanning direction. In the present example, the recording device 10 is an ink jet printer. However, the recording device 10 may be another type of recording device such as a laser printer. The print head is not limited to the print head that reciprocates in the main scanning direction, and may be a mechanism that is fixed at a predetermined position such as a line head.

A touch panel 13 is configured to display predetermined information on a user based on an image signal and to output an operation signal corresponding to the touch operation of the user. A communication unit 14 is configured to communicate with a transmission source of print data to transmit and receive various data. A control unit 15 is coupled to the recording unit 11, the transport unit 12, the touch panel 13, and the communication unit 14, and is configured to control the entire recording device 10.

The recording unit 11 and the transport unit 12 include a movable part. Power source for driving the movable parts of the recording unit 11 and the transport unit 12 is an electric motor, and a rotational force of a drive shaft in the electric motor is transmitted to respective constitutional parts by way of a gear mechanism thus allowing the respective constitutional parts to perform predetermined displacement. For example, the transport unit 12 is provided with a transport roller for moving the recording paper along the transport path while being in contact with the recording paper, and when the drive shaft of the electric motor rotates, the transport roller also rotates.

At this time, how many times the transport roller needs to be rotated is determined depending on how much the recording paper needs to be transported. In such a case, a rotation detection device is used to detect a rotational angle of the transport roller and the like. The rotation detection device has been used for various applications, such as the detection of a movement amount of the print head in the main scanning direction but not only the detection of the rotational angle of the transport roller.

Figure 2:
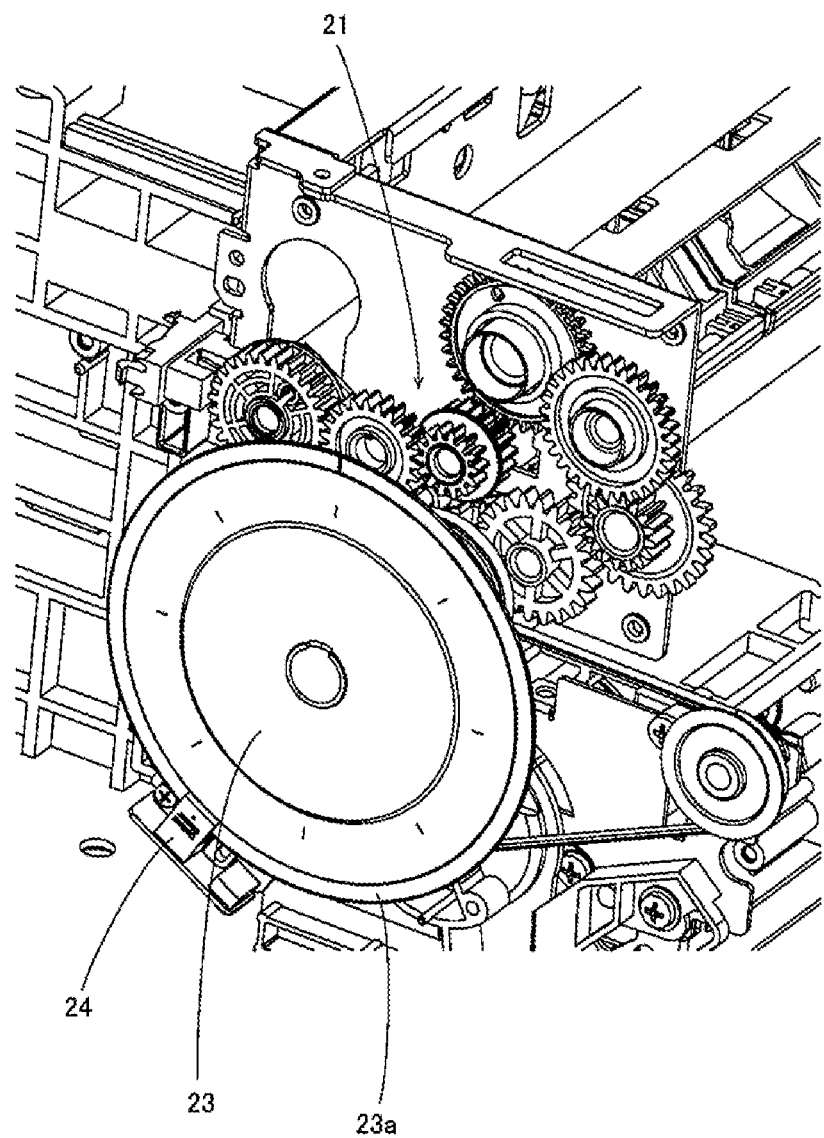
FIG. 2 is a perspective view of a portion of a drive mechanism to which the rotation detection device of the present disclosure is applied.
Figure 3:
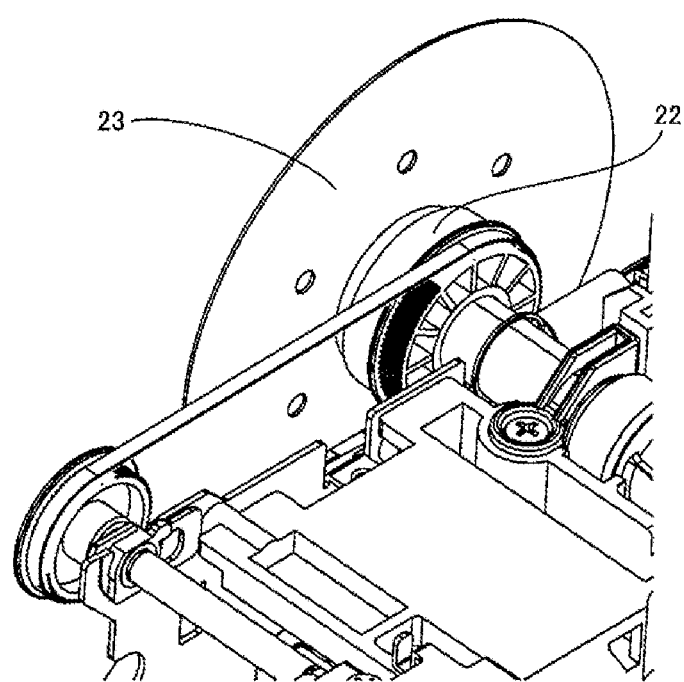
FIG. 3 is a perspective view of a portion of the drive mechanism to which the rotation detection device of the present disclosure is applied.

FIG. 2 and FIG. 3 are perspective views of a portion of the drive mechanism to which the rotation detection device of the present disclosure is applied.

As illustrated in the drawings, a gear mechanism 21 including a plurality of gears having various shapes is formed, and pulleys and a belt are also adopted for the gears. In the gear mechanism 21, a pulley 22 is included as one rotary body, and the pulley 22 has a substantially circular columnar shape including a belt groove or the like. The pulley 22 having the circular cylindrical shape rotates in a circumferential direction using a circular-columnar core as a rotation axis. When the pulley 22 has the circular columnar shape, a bottom surface or an end surface of the pulley 22 corresponding to an end portion in the thrust direction, and a scale 23 formed in a substantially disc shape is mounted at the end portion, and rotates integrally with the pulley 22 that is formed as the rotary body.

In the present embodiment, although the rotary body is the pulley 22 that transmits power, the rotary body is not limited to the pulley 22, and may be a rotary shaft of the pulley 22, or may be a gear that transmits power or a rotary shaft of the gear. With such a configuration, it is possible to detect the rotation of the pulley or the gear.

The scale 23 is provided with a code portion 23a in which a large number of slits are formed at fixed intervals on an outer peripheral portion, and a detection unit 24 having a U-shaped photo sensor configured to sandwich the code portion 23a is provided in the vicinity of a lower side of the scale 23. The rotation detection device is constituted of the scale 23 and the detection unit 24. The rotation detection device is configured such that, when the scale 23 rotates, the slits of the code portion 23a move between the photo sensor of the detection unit 24, transmission light is turned on or off between a light-emitting element and a light-receiving element that opposedly face each other with the code portion 23a sandwiched therebetween, and the amount of rotation of the scale 23 and the pulley 22 is detected based on the number of times of turning on and turning off of the transmission light detected by the detection unit 24.

Since the code portion 23a is constituted by the slits formed in the scale 23 in a penetrating manner, it is safe to say that both surfaces of the scale 23 form reading regions. In the present example, although the slits are formed over the entire circumference, the code portion 23a may be formed only on a part of the pulley 22 that is the rotating body. For example, provided that only the number of times of rotation is detected, it is sufficient for the code portion 23a to be formed only one portion in the circumferential direction.

In the scale 23 of the present example, the code portion 23a has the slits, and the light emitting element and the light receiving element opposedly face each other so as to sandwich the plate-like scale 23 therebetween. That is, the detection unit 24 faces both surfaces of the scale 23. However, the code portion 23a does not need to be formed of the slits, and the code portion 23a may be configured such that reflecting members are formed on only one surface of the scale 23 at fixed intervals in a slit shape, the detection unit 24 is disposed so as to opposedly face only the one surface, the cord portion 23a is irradiated by the light emitting element, and the amount of rotation of the scale 23 and the pulley 22 is detected based on turning-on and turning-off of reflection light that the light receiving element corresponds to the slit-shaped reflecting members. In this case, the reading region of the scale 23 is a surface on which the reflecting members are formed.

As illustrated in FIG. 2, in order to rotate the pulley 22, a gear mechanism 21 is disposed in the vicinity of the pulley 22, and grease for reducing friction is applied to the gear mechanism 21. When the gear mechanism 21 operates, there is a possibility that the grease is scattered to the surrounding along with the rotation. Since the scale 23 is located within a range where the grease is scattered, the grease adheres to the scale 23. At this time, when the grease adheres to the code portion 23a of the scale 23, the reading failure may occur. In addition, when the grease adheres to a portion of the scale 23 where the scale 23 is attached to the pulley 22, there is a possibility that an adhesive force is decreased, and the scale 23 is removed from the pulley 22.

Figure 4:
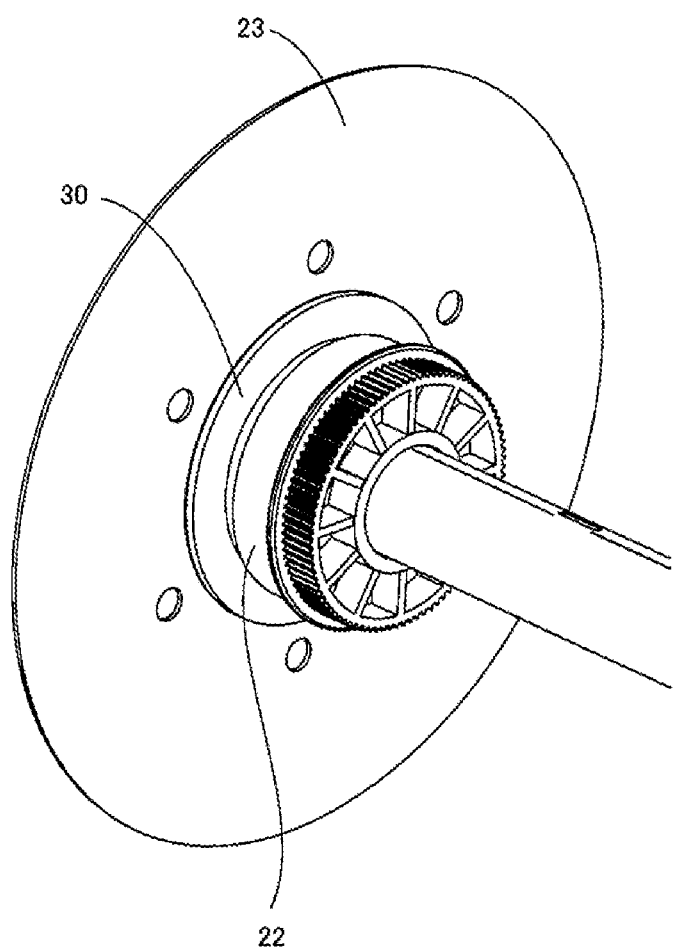
FIG. 4 is a perspective view of a scale of the rotation detection device.
Figure 5:
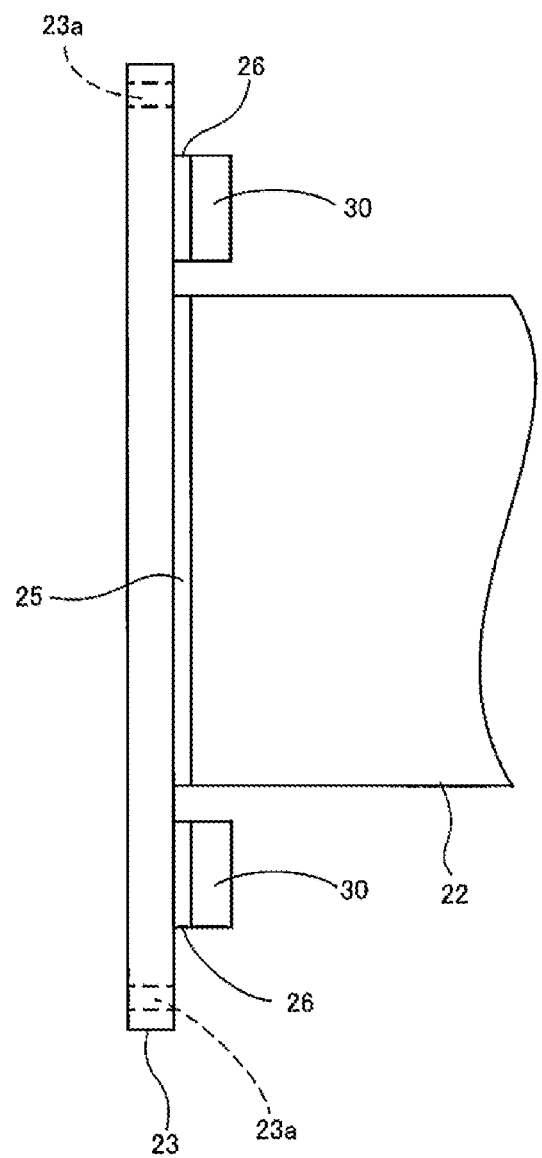
FIG. 5 is a schematic cross-sectional view of the scale and a rotating body.
Figure 6:
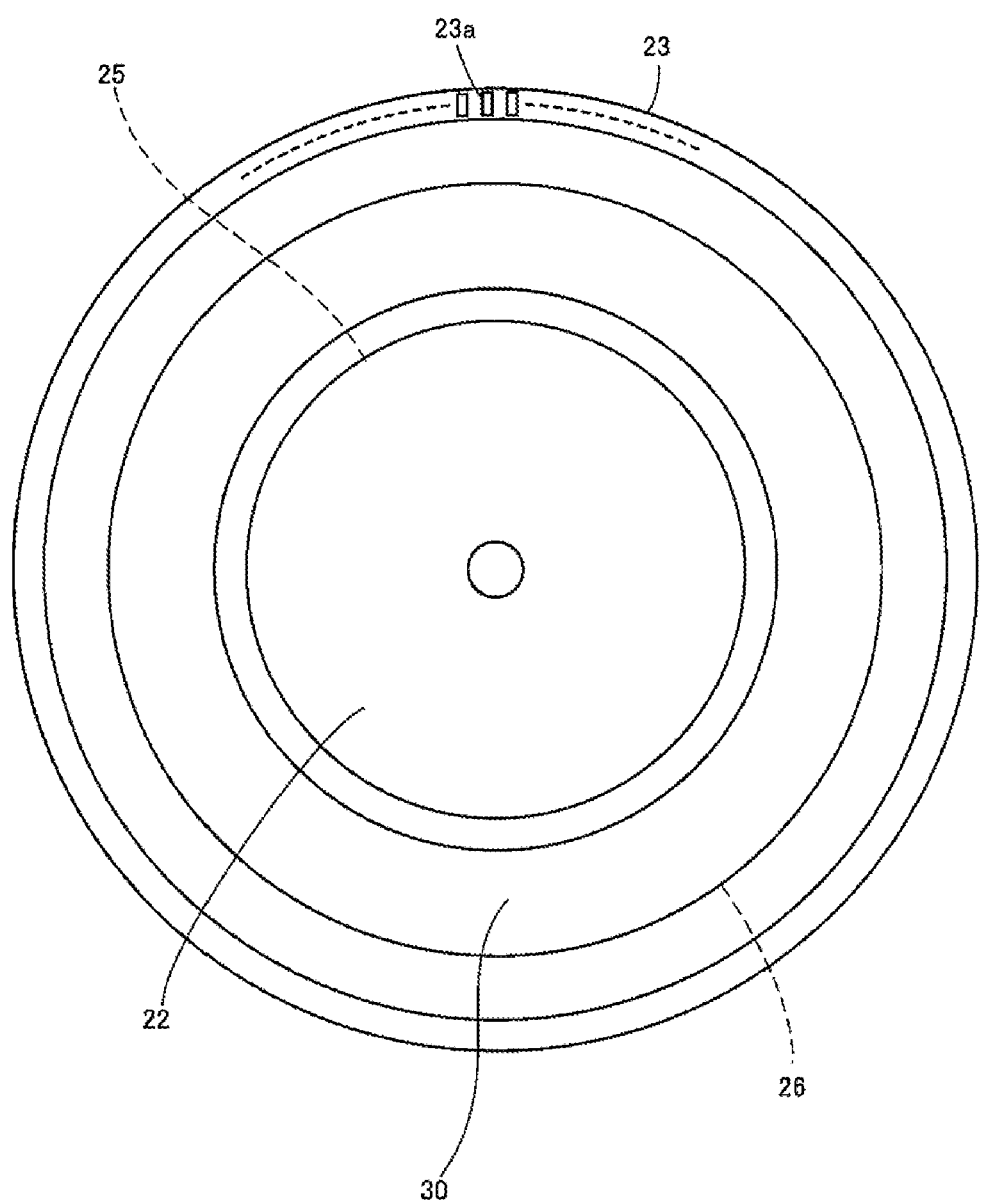
FIG. 6 is a schematic view illustrating a positional relationship between the scale and an absorber.

FIG. 4 is a perspective view of the scale of the rotation detection device, FIG. 5 is a schematic cross-sectional view of the scale and the rotary body, and FIG. 6 is a schematic view illustrating a positional relationship between the scale and an absorber.

An end surface of the pulley 22 that is formed of a circular columnar rotary body is a circular flat surface, and the pulley 22 and the scale 23 are fixed to each other by a first double-sided adhesive tape 25 having a circular shape in a state where the end surface of the pulley 22 and the disc-shaped scale 23 are positioned concentrically. As illustrated in FIG. 5 and FIG. 6, a diameter of the first double-sided adhesive tape 25 is substantially the same as a diameter of the pulley 22. Further, on the same surface of the scale 23, a doughnut-shaped absorber 30 having an inner diameter slightly larger than the diameter of the pulley 22 and having an outer diameter lightly larger than the inner diameter is fixed by a second double-sided adhesive tape 26 having substantially the same shape as the absorber 30. However, the absorber 30 may be larger than the second double-sided adhesive tape 26. The absorber 30 is formed of a material that is easy to absorb liquid, and is formed of a sponge-like material, or a paper-like material.

In this manner, by providing the absorber 30 on a reading surface of the scale 23 on which the reading region is formed, it is possible to absorb the grease adhering to the reading surface of the scale 23. With such a configuration, it is possible to suppress the occurrence of reading failure when the grease adheres to the scale 23. Here, the reading surface means the entire surface on a side to be read, and does not mean only the region to be read.

Further, the scale 23 is bonded to the pulley 22, that is the rotary body, by the first double-sided adhesive tape 25, and the absorber 30 is bonded to the scale 23 by the double-sided adhesive tape 26 that is different from the first double-sided adhesive tape 25. By performing the bonding using the double-sided adhesive tape, the absorber 30 can be attached with a simple configuration. However, each of the first double-sided adhesive tape 25 and the second double-sided adhesive tape 26 may be formed of a single double-sided adhesive tape or a plurality of double-sided adhesive tapes. Further, both the first double-sided adhesive tape 25 and the second double-sided adhesive tape 26 may be formed of a single double-sided adhesive tape.

The absorber 30 of the present example has substantially the same shape as the second double-sided adhesive tape 26, and an inner diameter of the second double-sided adhesive tape 26 is slightly larger than the diameter of the pulley 22. Accordingly, the absorber 30 is slightly larger than the rotary body that forms the pulley 22 in diameter and hence, the absorber 30 is spaced apart from the rotary body. However, the absorber 30 may not be separated from the rotary body.

When the absorber 30 is in contact with the pulley 22 serving as the rotary body, there is a possibility that the absorber 30 is rubbed when the rotary body rotates. The absorber 30 is spaced apart from the rotary body and hence, the occurrence of such a defect can be suppressed. Further, even when there is an error in hole diameter of the absorber 30 due to variation in parts, by setting the size of the absorber 30 such that the absorber 30 is spaced apart from the pulley 22 in advance, the attachment of the absorber 30 can be easily performed.

In the present example, the reading region is provided to both surfaces of the scale 23 and hence, the absorber 30 is attached to a first surface where the reading region exists. It is not necessary for the absorber 30 to be attached to the entire surface of the first surface, and it is sufficient for the absorber 30 to be attached to at least a portion of the first surface. For example, in other words, the doughnut shape is a circular shape continuous in the circumferential direction and hence, the absorber 30 is attached entirely in the circumferential direction of the first surface on which the reading region exists. "At least a portion" means not only a case where the absorber 30 is formed to make one round in the circumferential direction, but also a case where a plurality of the absorbers 30 may be provided at intervals or a case where the absorber 30 may be provided at only one portion.

When the absorber 30 is provided at least a portion, it is possible to absorb the grease in the vicinity of the portion and hence, it is possible to acquire an effect of suppressing the occurrence of reading failure in the periphery of the portion.

Figure 7:
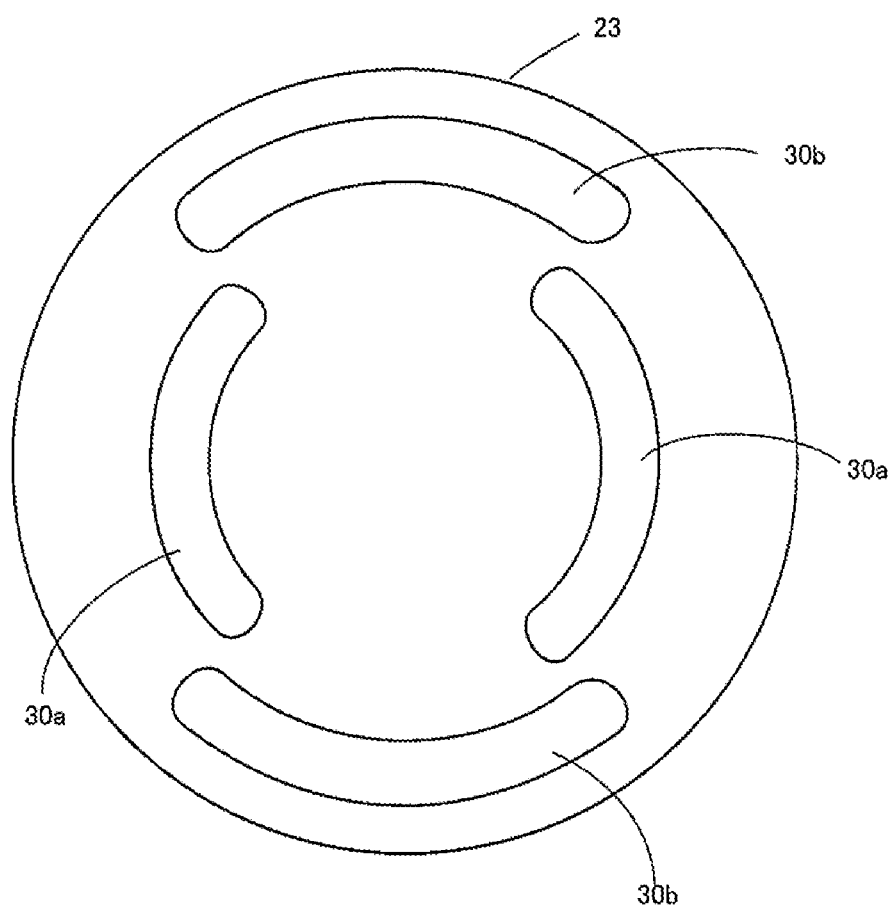
FIG. 7 is a schematic view illustrating a positional relationship between a scale and an absorber according to another modification.

FIG. 7 is a schematic view illustrating a positional relationship between a scale and an absorber according to another modification.

As illustrated in FIG. 7, even when an absorber 30 is formed in a divided manner, such as, two arc-shaped inner absorber 30*a* and two arc-shaped outer absorber 30*b*, it is considered that the absorber 30 is disposed over 360 degrees with an axis of the scale 23 as a reference and hence, such a configuration corresponds to the configuration where the absorber 30 is attached entirely in the circumferential direction. This also means that the absorber 30 is attached so as to cover a portion of an attachment surface over the entire circumference in the circumferential direction.

By providing the absorber 30 entirely in the circumferential direction of the scale 23, even when the grease adheres to any places of the scale 23 in the circumferential direction, the absorber 30 can be positioned on a gravity direction side or a centrifugal force direction side of the portion where the grease adheres due to the rotation of the rotary body and hence, it is possible to absorb the grease adhering to the scale. With such a configuration, it is possible to suppress the occurrence of reading failure when the grease adheres to the scale 23 more effectively. In addition to the circumferential direction, with respect to the radial direction, it is sufficient for the absorber to be provided to at least a portion of the reading surface, and the absorber may be provided at any position.

An outer periphery of the absorber 30 and an outer periphery of the second double-sided adhesive tape 26 are disposed inside the reading region so as not to cover the above-mentioned code portion 23*a* that forms the reading region. Accordingly, the detection unit 24 reads the reading region on the first surface, and the absorber 30 is attached to the region excluding the reading region on the first surface.

By attaching the absorber 30 while avoiding the reading region, it is possible to suppress the occurrence of a reading failure due to the absorber 30. It is sufficient for the absorber 30 to be attached while avoiding the reading region, it is not necessary for the absorber 30 to be attached to the entire surface of the reading surface excluding the reading region.

In the present example, the code portion 23*a* is formed of the slits and hence, both surfaces of the scale 23 are formed as the first surface on which the reading region is formed. Accordingly, an attachment surface where the scale 23 is attached to the rotary body is also a surface where the reading region is present. In this case, it is possible to suppress the occurrence of reading failure by the absorber 30 provided on one surface and, at the same time, it is possible to suppress the removal of the scale 23. Here, in the present example, the absorber 30 is attached to a surface serving also as the attachment surface out of both surfaces of the scale 23 capable of being the first surface. However, the absorber 30 may be attached to both surfaces of the scale 23.

In the configuration where the reading region is formed on one surface of the scale 23, the detection unit 24 can be disposed on the same side as the attachment surface and hence, the applicability of the rotation detection device can be easily increased.

On the other hand, in the configuration where the reading region is formed on one surface of the scale 23, the attachment surface can be also formed as a surface on a side opposite to a surface having the reading region. In a case where the attachment surface and the surface having the reading region are disposed on sides opposite to each other, the detection unit 42 can be disposed on a side opposite to the attachment surface and hence, it is possible to eliminate an obstacle with respect to the installation position whereby the rotation detection device can be easily disposed.

In this case, the occurrence of reading failure may be suppressed by attaching the absorber 30 to the first surface on which the reading region is formed, and the removal of the scale 23 may be suppressed by attaching the absorber 30 to the attachment surface, and the occurrence of reading failure and the removal of the scale 23 may be suppressed by attaching the absorber 30 to the both surfaces.

At this time, various arrangements are possible as in the case of arranging of the absorber 30 to the reading surface. For example, by providing the absorber 30 entirely in the circumferential direction of the scale 23, even when the grease adheres to any places of the scale 23 in the circumferential direction, the absorber 30 can be positioned on a gravity direction side or a centrifugal force direction side of the portion where the grease adheres due to the rotation of the rotary body and hence, it is possible to absorb the grease adhering to the scale 23. With such a configuration, it is possible to suppress the peeling-off of the scale 23 when the grease adheres to the scale 23 more effectively.

Here, in FIG. 6, a hole is formed also in the center of the first double-sided adhesive tape 25. However, the hole is formed merely corresponding to the shapes of the scale 23 and the pulley 22 and hence, the above-mentioned advantageous effects are not particularly affected by the present or absence of the hole. Here, the pulley 22 serving as the rotary body is fixed concentrically with the scale 23 and hence, the absorber 30 is attached to a rotation axis portion of the attachment surface formed on the scale 23. Here, the rotation axis portion is a region including the rotation axis of the scale 23 on the attachment surface of the scale 23. Further, the absorber 30 has substantially the same shape as the end surface of the pulley 22 and is attached to the end surface and hence, the absorber 30 is attached to the periphery of the rotation axis portion of the attachment surface of the scale 23.

By providing the absorber 30 on the attachment surface of the scale 23, it is possible to absorb the grease adhering to the attachment surface of the scale 23, and it is possible to suppress the removal of the scale 23 when the grease adheres to the scale 23. As a matter course, the attachment surface means the entire surface on a side where the scale 23 is attached to the pulley, and does not mean only a region adhered to the pulley.

Here, the attachment surface of the scale 23 may be a reading surface.

Next, an operation of the above-mentioned configuration according to the present embodiment will be described.

When performing printing using the recording device 10 that is the ink jet printer, the transport unit 12 starts operation, the recording paper moves along a predetermined transport path, and the print head of the recording unit 11 moves in a reciprocating manner thus performing recording. In movable portions of the recording unit 11 and the transport unit 12, the electric motor rotates, and the gear mechanism 21 and the pulley 22 rotate.

When the gear mechanism 21 operates, the grease adhering to the gear receives a force from a rotation axis toward the outside by a centrifugal force and hence, there arises a phenomenon that the grease is scattered to the surrounding depending on the balance between the temperature and the viscosity of the grease. The scattered liquid grease adheres to the scale 23 in the vicinity of the gear mechanism 21. In the related art, there is a case where grease adhering to the scale 23 moves toward the outside due to a centrifugal force, reaches the code portion 23a located close to the outer periphery of the scale 23, and enters the slits, for example. When a foreign material enters a certain slit, the detection unit 24 cannot detect that the slit is open, the detection unit 24 recognizes that the scale 23 does not rotate although the slit actually passes through the detector 24, and an error occurs in an amount of rotation.

The scattering and flowing of the grease are cased not only by the centrifugal force, but flowing down due to the gravity is also included.

However, in the present example, the absorber 30 is attached to the scale 23 and hence, even when the grease is scattered, the liquefied grease is absorbed by the absorber 30. Accordingly, even when the scale 23 rotates, there is no possibility that the grease flows out to the outer periphery along the surface of the scale 23. Since the grease does not flow to the outer periphery, it is possible to suppress a phenomenon that, when the grease reaches the code portion 23a, a problem occurs in the rotation detection.

Figure 8:
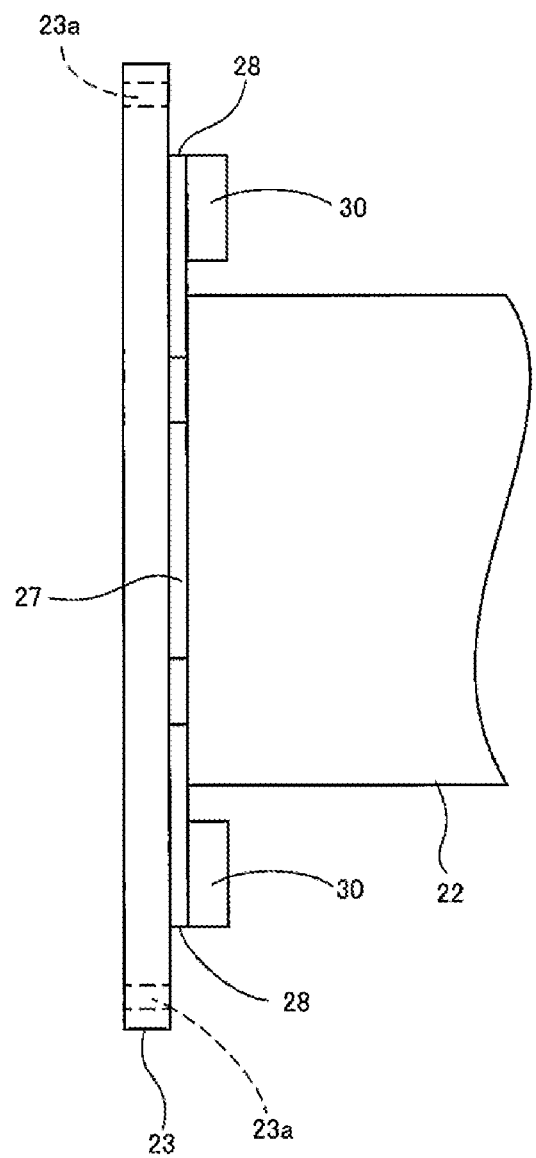
FIG. 8 is a schematic cross-sectional view of a scale and a rotating body according to a modification.
Figure 9:
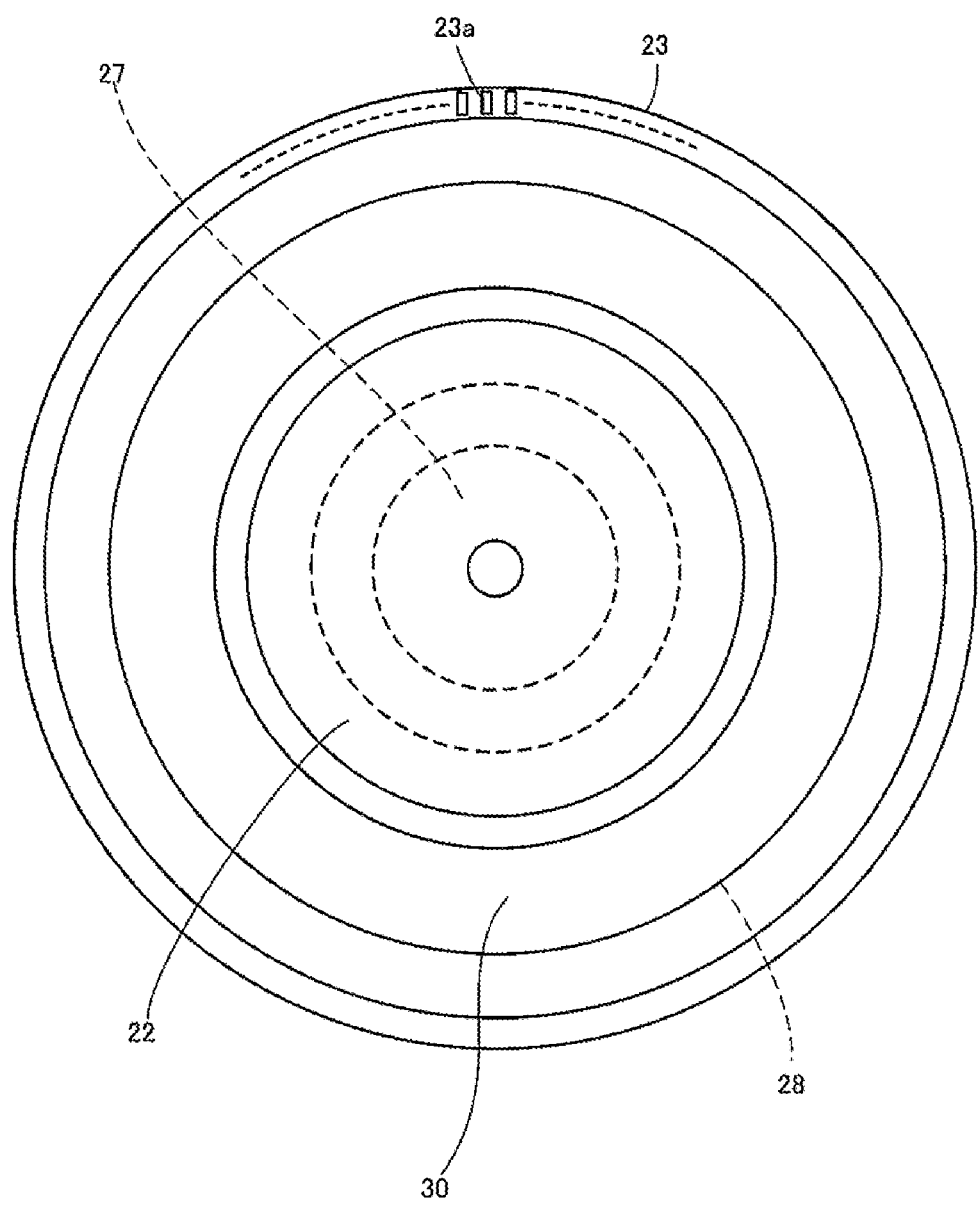
FIG. 9 is a schematic view illustrating a positional relationship between a scale and an absorber according to a modification.

FIG. 8 is a schematic cross-sectional view of a scale and a rotary body according to a modification, and FIG. 9 is a schematic view illustrating a positional relationship between the scale and an absorber according to the modification.

In this modification, a diameter of a first double-sided adhesive tape 27 is smaller than a diameter of the pulley 22, and an inner diameter of a doughnut-shaped second double-sided adhesive tape 28 is slightly larger than an outer diameter of the first double-sided adhesive tape 27 and is slightly smaller than the diameter of the pulley 22, and an outer diameter of the second double-sided adhesive tape 28 is substantially equal to an outer diameter of an absorber 30.

With such a configuration, the pulley 22 serving as the rotary body is bonded to the scale 23 by both the first double-sided adhesive tape 27 and the second double-sided adhesive tape 28. Further, although a slight gap is formed between the first double-sided adhesive tape 27 and the second double-sided adhesive tape 28, this gap is closed by the end surface of the pulley 22.

In an end portion of the pulley 22 serving as the rotary body, a region close to the center of rotation of the rotary body is referred to as a first region, and in the first region, the pulley 22 is bonded with the scale 23 by the first double-sided adhesive tape 27. Further, in the end portion of the pulley 22 serving as the rotary body, when a region further away from the center of rotation than the first region is referred to a second region, in the second region, the end portion of the pulley 22 and the scale 23 are bonded to each other by the second double-sided adhesive tape 28. Still further, the absorber 30 is bonded to the scale 23 by the second double-sided adhesive tape 28.

As illustrated in FIG. 5, in a case where the end surface of the pulley 22 is adhered to the scale 23 only by the first double-sided adhesive tape 25, and the absorber 30 is adhered to the scale 23, with a slight gap, by the doughnut-shaped second double-sided adhesive tape 26, a phenomenon may arise where the grease firstly adheres to a side surface of the pulley 22, and the grease flows toward the scale 23 through the side surface of the pulley 22. As a result, although the grease is also adsorbed by the absorber 30, the side surface of the first double-sided adhesive tape 25 is also wetted by the grease. That is, by providing the absorber 30 as illustrated in FIG. 5, it is possible to suppress the occurrence of reading failure and the removal of the scale due to the grease to some extent compared to a configuration in which the absorber 30 is not provided. However, in some cases, there is a possibility that the grease enters a bonding surface between the first double-sided adhesive tape 25 and the scale 23. At this time, when the intrusion of the grease is further advanced, the peeling-off of the first double-sided tape 25 and the scale 23 may occur.

However, as illustrated in FIG. 8, in a case where a second double-sided adhesive tape 28 has an inner peripheral shape that reaches the end surface of the pulley 22, when the grease flows toward the scale 23 along the side surface of the pulley 22, the grease is absorbed by the absorber 30 and an exposed surface of the second double-sided adhesive tape 28 is wetted by the grease. However, although the grease reaches at the surface of the second double-sided adhesive tape 28, there is no possibility that the grease penetrates the second double-sided adhesive tape 28 and enters the bonding surface between the second double-sided adhesive tape 28 and the scale 23. As a result, it is possible to suppress the peeling-off of the first double-sided adhesive tape 27 and the scale 23.

In this manner, the grease adhering to the pulley 22 serving as the rotary body, and the grease adhering to the second double-sided adhesive tape 28 on an end portion side of the pulley 22 are absorbed by the absorber 30. At this time, although there is a possibility that the viscosity of the second double-sided adhesive tape 28 is decreased, the grease does not adhere to the first double-sided adhesive tape 27 and hence, a state where the scale 23 and the pulley 22 are firmly bonded to each other can be maintained whereby it is possible to more effectively suppress the removal of the pulley 22. Here, in the present example, although the absorber 30 and the pulley 22 are sized so as to be spaced apart from each other in advance, even in a configuration where the absorber 30 and the pulley 22 are in close contact with each other, there is a possibility that a gap is generated depending on variation in parts. Accordingly, in a configuration where the absorber 30 and the pulley 22 are in close contact with each other, the attachment method as illustrated in FIG. 8 also can acquire the advantageous effect.

According to the recording device 10 as in the case of the present example, it is possible to detect driving of the transport unit that transports a medium. Further, the rotation detection device is applicable to, besides the configuration of transporting the medium, a configuration of moving the recording head in a vertical direction for defining a distance between the recording head and the medium, and a configuration of advancing and retracting or opening or closing a stacker, a cover and the like.

Figure 10:
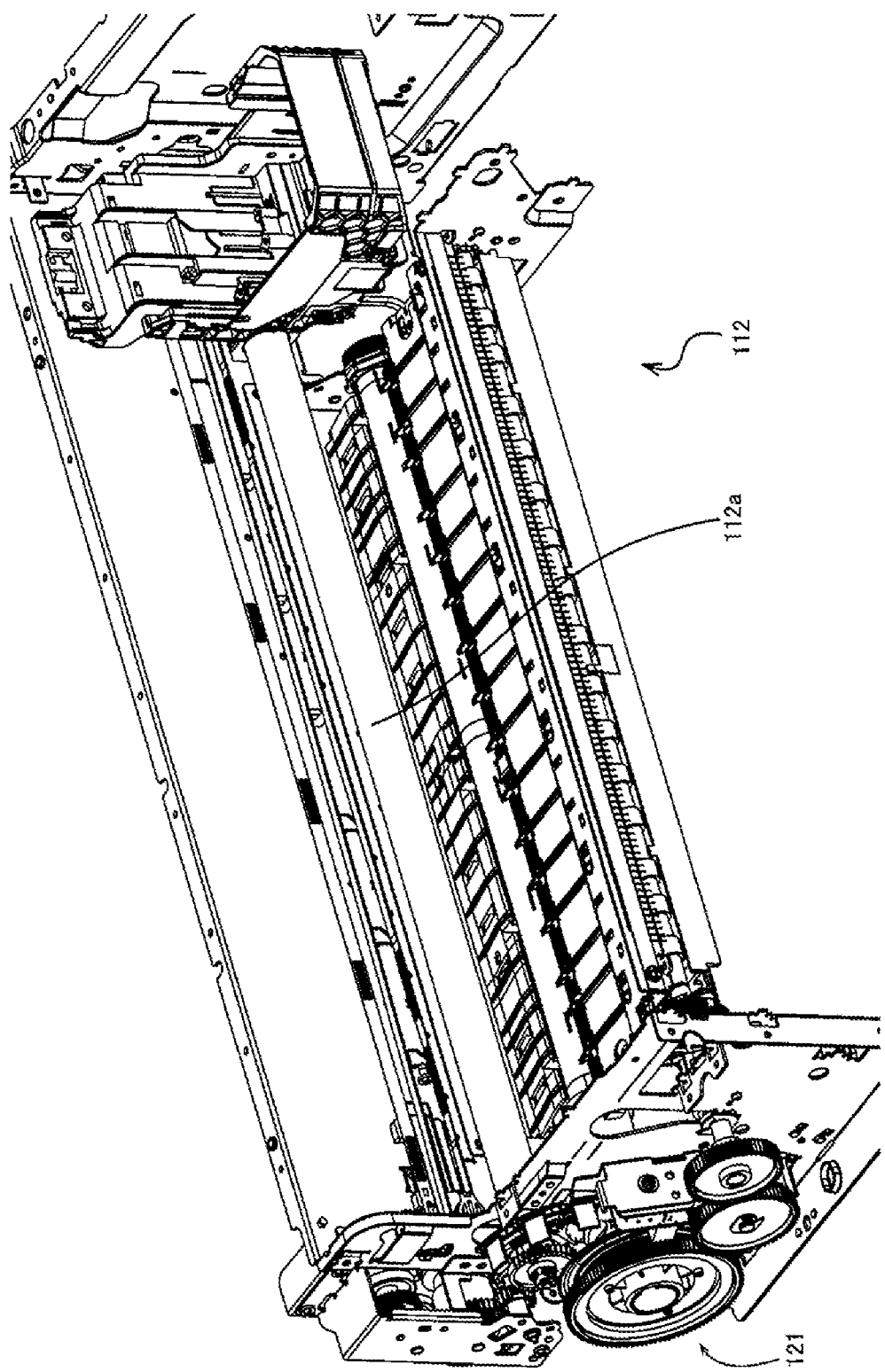
FIG. 10 is a perspective view of a portion of a drive mechanism to which a rotation detection device according to a modification is applied.
Figure 11:
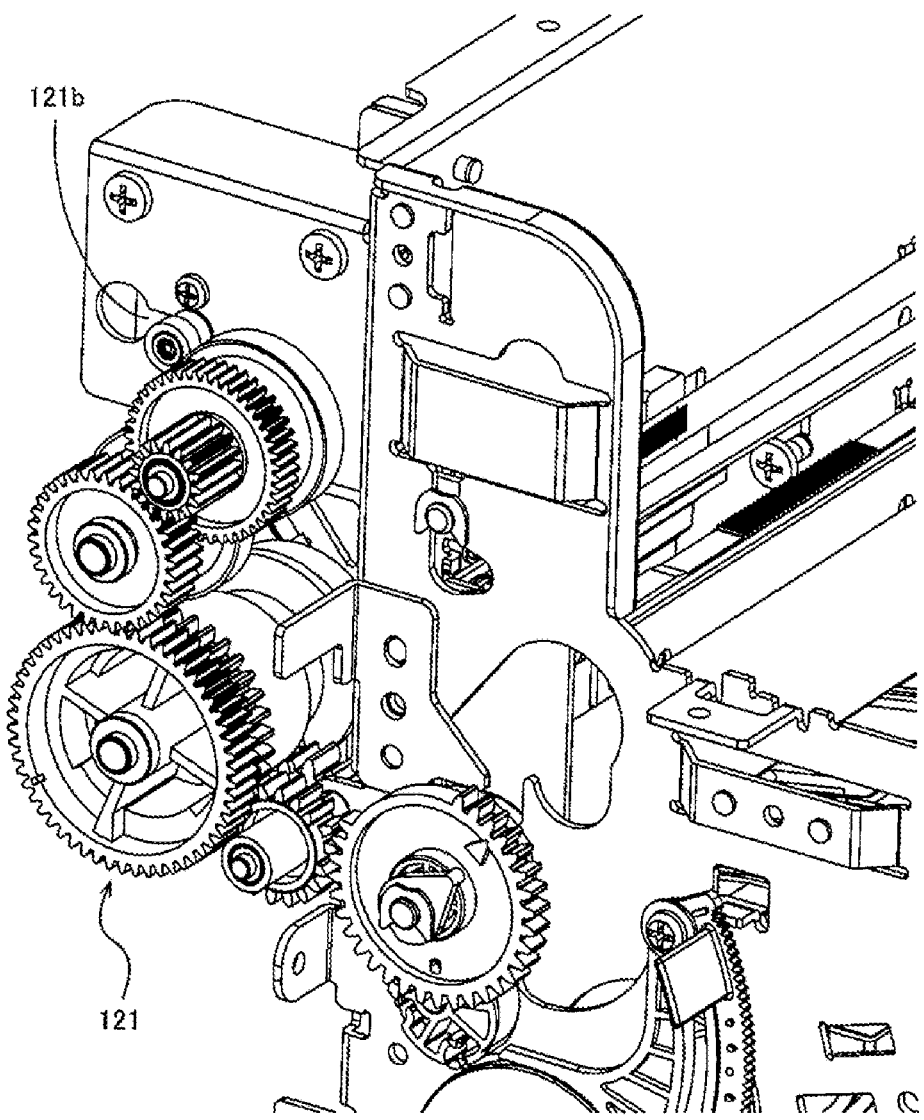
FIG. 11 is an enlarged perspective view of a portion of the drive mechanism.
Figure 12:
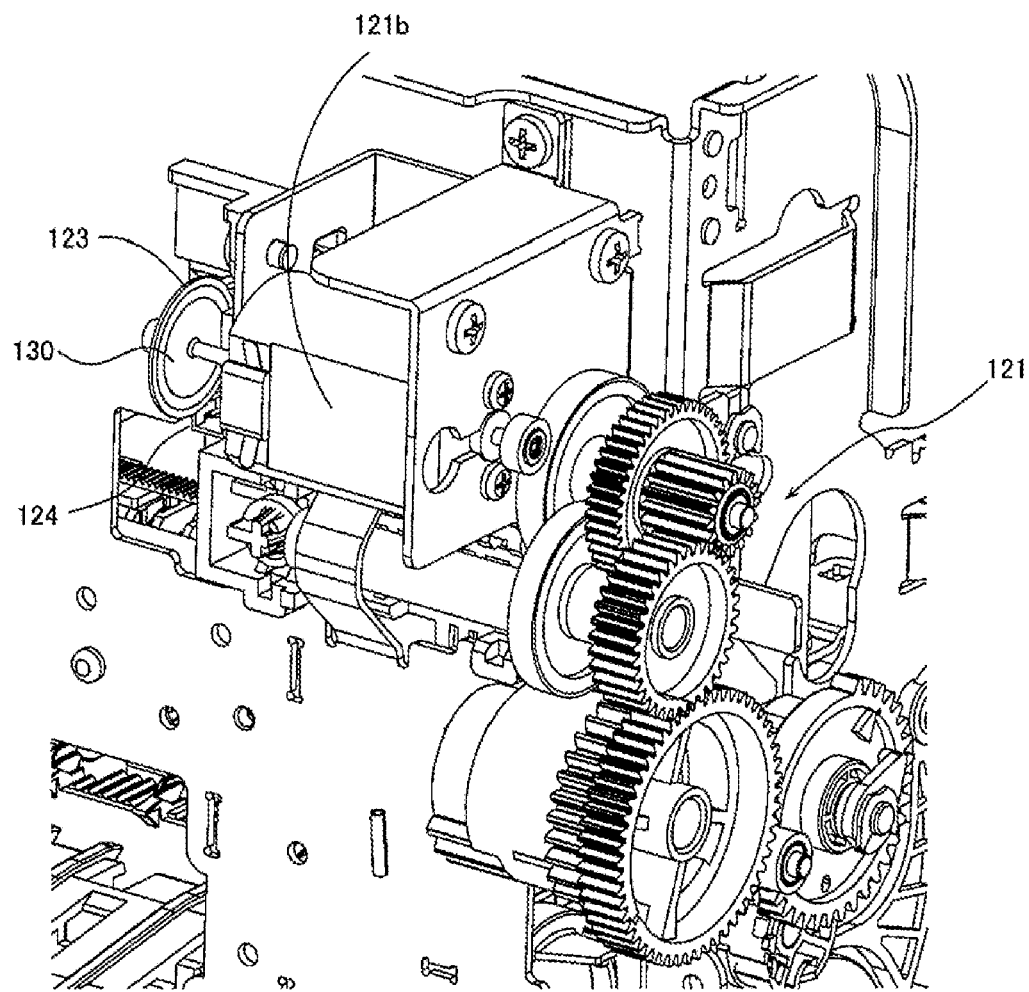
FIG. 12 is a perspective view illustrating a rotation detection device used in the drive mechanism.

FIG. 10 to FIG. 12 respectively illustrate a portion of a drive mechanism according to a modification to which the rotary detection device of the present disclosure is applied. FIG. 10 is a perspective view illustrating a portion of the drive mechanism to which the rotation detection device is applied, FIG. 11 is an enlarged perspective view of the portion illustrated in FIG. 10, and FIG. 12 is a perspective view illustrating the rotation detection device used in this drive mechanism.

As illustrated in FIG. 10, a transport unit 112 is provided with a carriage shaft 112a, and when a drive shaft of an electric motor not illustrated in the drawing rotates, the carriage shaft 112a is moved in a vertical direction by a mechanism coupled to a gear mechanism 121.

As illustrated in FIG. 11 and FIG. 12, the gear mechanism 121 is rotatably driven by way of a rotary shaft of an electric motor 121b. Further, a disc-shaped scale 123 is coupled to a rotary shaft of the electric motor 121b on a side opposite to the gear mechanism 121, and the scale 123 rotates integrally with the rotary shaft. A detection unit 124 is disposed adjacent to the scale 123, and the detection unit 124 detects the amount of rotation of the scale 123 and the electric motor 121b.

Also in such a configuration, by attaching a doughnut-shaped absorber 130 to a surface of the scale 123 on which a reading region is present using a double-sided adhesive tape, the absorber 130 effectively absorbs grease scattered by the gear mechanism 121 and hence, it is possible to suppress the occurrence of a phenomenon that the grease reaches the reading region, whereby it is possible to prevent the occurrence of a problem in detection of a rotation amount. Further, the removal of the scale 123 may be suppressed by attaching the absorber 30 to the attachment surface, and the absorber 30 may be attached to both surfaces of the scale 123.

Figure 13:
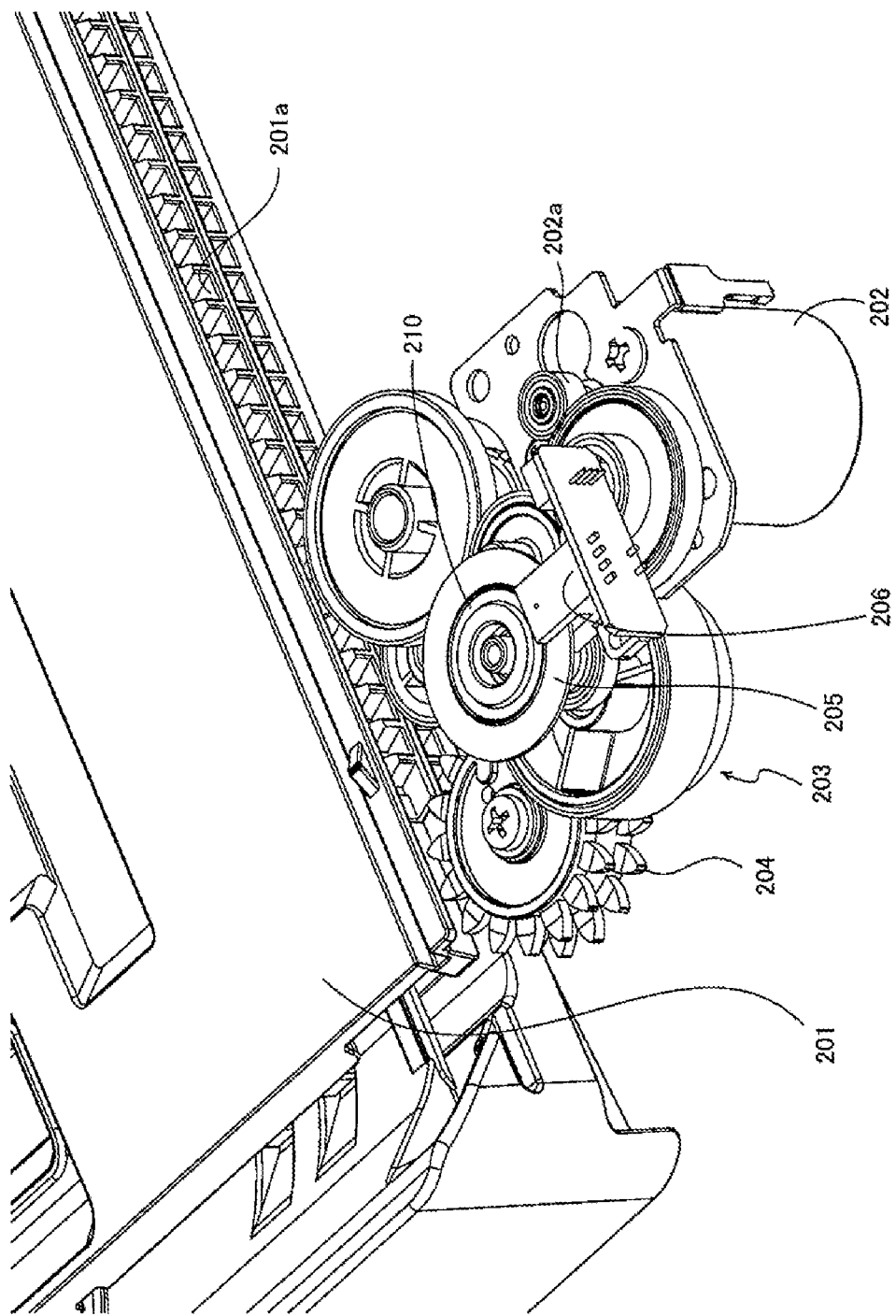
FIG. 13 is a perspective view of a portion of a drive mechanism to which a rotation detection device according to a modification is applied.

FIG. 13 is a perspective view of a portion of a drive mechanism according to a modification to which the rotation detection device of the present disclosure is applied.

This drive mechanism drives a stacker 201. A stacker driving motor 202 has a motor pinion 202a thereof fixed to a rotary shaft, and rotates a stacker driving gear 204 by way of a gear mechanism 203. The stacker driving gear 204 meshes with a straight-shaped rack 201a formed in the stacker 201 and hence, when the stacker driving gear 204 rotates, the rack 201a and the stacker 201 are moved linearly corresponding to a rotational direction.

Also in such a drive mechanism, it is necessary to detect an amount of rotation in the gear mechanism 203 for controlling an amount of movement of the stacker 201 and hence, a scale 205 and a detection unit 206 are provided. However, the gear mechanism 203 is disposed in the vicinity of the scale 205 and hence, there is a case where grease used in the gear mechanism 203 adheres to the scale 205, and the detection unit 206 cannot detect the amount of rotation of the scale 205 correctly.

Also in such a configuration, by attaching a doughnut-shaped absorber 210 to a surface of the scale 205 on which a reading region is present using a double-sided adhesive tape, the absorber 210 effectively absorbs grease scattered by the gear mechanism 203 and hence, it is possible to suppress the occurrence of a phenomenon that the grease reaches the reading region, whereby it is possible to prevent the occurrence of a problem in detection of a rotation amount. Further, the removal of the scale 205 may be suppressed by attaching the absorber 30 to the attachment surface, and the absorber 30 may be attached to both surfaces of the scale 205.

The rotation detection device is applicable to various applications. When the rotation detection device is applied to the recording device 10, it is possible to detect driving of the transport unit 11. Such a transport unit 11 generally provided with a roller (regardless of a drive-side roller or a driven roller), a belt, and the like for transporting a medium, and the amount of rotation of rotary shafts of these components can be detected. The transport unit 11 may include not only the configuration for transporting before and after recording but also any configuration among the configurations ranging from paper feeding to paper discharging. The rotary body corresponds to a rotary shaft per se for driving the transport roller, a configuration such as a support member configured coaxially with the rotary shaft, gears forming a gear train for transmitting a drive force to the rotary shaft, a pulley for driving a transport belt, a motor serving as a drive source, and the like.

Finally, by providing the rotation detection device described above and the transport unit configured to transport the medium, the medium transport device can be formed, and the rotary body drives the transport unit.

Further, by providing the medium transport device and the recording unit configured to perform recording on a medium such as a recording paper, the recording device can be formed.

Still further, by providing the rotation detection device configured to detect the rotation of the drive mechanism according to the modification and the recoding unit configured to perform recording on the medium, the recording device can be formed.

Here, the application of the rotation detection device of the present disclosure is not limited to the recording device.

Here, it is needless to say that the present disclosure is not limited to the above-mentioned exemplary embodiment. Although it goes without saying for those who are skilled in the art, the following applications are also disclosed as examples of the present disclosure.

The application where the members, the constitutional elements and the like that are mutually exchangeable and are disclosed in the above-mentioned examples are suitably exchanged, and the combinations of these members, constitutional elements and the like are changed.

Although not disclosed in the above-mentioned examples, the application where members, constitutional elements and the like of the related art which are exchangeable with the members, the constitutional elements and the like disclosed in the above-mentioned examples are suitably exchanged, and the change of the combinations of these members, constitutional elements and the like.

Although not explicitly disclosed in the above-mentioned embodiments, the application where members, constitutional elements and the like that those who are skilled in the art can conceive as substitutes for the members, the constitutional elements and the like disclosed in the above-mentioned examples, and the change of the combinations of these members, constitutional elements and the like.

What is claimed is:

1. A rotation detection device comprising:
   a rotary body configured to rotate in a circumferential direction;
   a drive mechanism configured to rotate the rotary body;
   a scale attached to an end portion of the rotary body in a thrust direction and configured to rotate integrally with the rotary body;
   a detection unit configured to detect the rotation of the rotary body by reading a reading region of the scale; and
   an absorber attached to a first surface of the scale facing the drive mechanism.

2. The rotation detection device according to claim 1, wherein
   the absorber is attached to the first surface having the reading region.

3. The rotation detection device according to claim 2, wherein
   the absorber is attached to at least a portion of the first surface.

4. The rotation detection device according to claim 2, wherein
   the detection unit is configured to read the reading region on the first surface, and
   the absorber is attached to a region of the first surface excluding the reading region.

5. The rotation detection device according to claim 1, wherein
   a rotation axis portion of an attachment surface formed on the scale is attached to the rotary body, and
   the absorber is attached to the attachment surface around the rotation axis portion.

6. The rotation detection device according to claim 5, wherein the absorber is attached to cover a portion of the attachment surface corresponding to an entire circumference in the circumferential direction.

7. The rotation detection device according to claim 5, wherein
   the attachment surface is a surface on a side opposite to a surface having the reading region.

8. The rotation detection device according to claim 5, wherein
   the attachment surface is a surface having the reading region.

9. The rotation detection device according to claim 1, wherein
   the scale is bonded to the rotary body with a first double-sided adhesive tape, and
   the absorber is bonded to the scale by a second double-sided adhesive tape that is different from the first double-sided adhesive tape.

10. The rotation detection device according to claim 1, wherein
    in the end portion of the rotary body, a first region in a vicinity of a center of rotation of the rotary body is bonded to the scale with a first double-sided adhesive tape,
    in the end portion of the rotary body, a second region further away from the center of rotation than the first region is bonded to the scale with a second double-sided adhesive tape, and
    the absorber is bonded to the scale by the second double-sided adhesive tape.

11. The rotation detection device according to claim 1, wherein the absorber is spaced apart from the rotary body.

12. The rotation detection device according to claim 1, wherein
    the rotary body is a gear for transmitting power or a rotary shaft of the gear.

13. The rotation detection device according to claim 1, wherein
    the rotary body is a pulley for transmitting power or a rotary shaft of the pulley.

14. A medium transport device comprising:
    the rotation detection device according to claim 1; and
    a transport unit configured to transport a medium, wherein the rotary body is configured to drive the transport unit.

15. A recording device comprising:
    the medium transport device according to claim 14; and
    a recording unit configured to perform recording on the medium.

16. A recording device comprising:
    the rotation detection device according to claim 1; and
    a recording unit configured to perform recording on a medium.

* * * * *